UNITED STATES PATENT OFFICE.

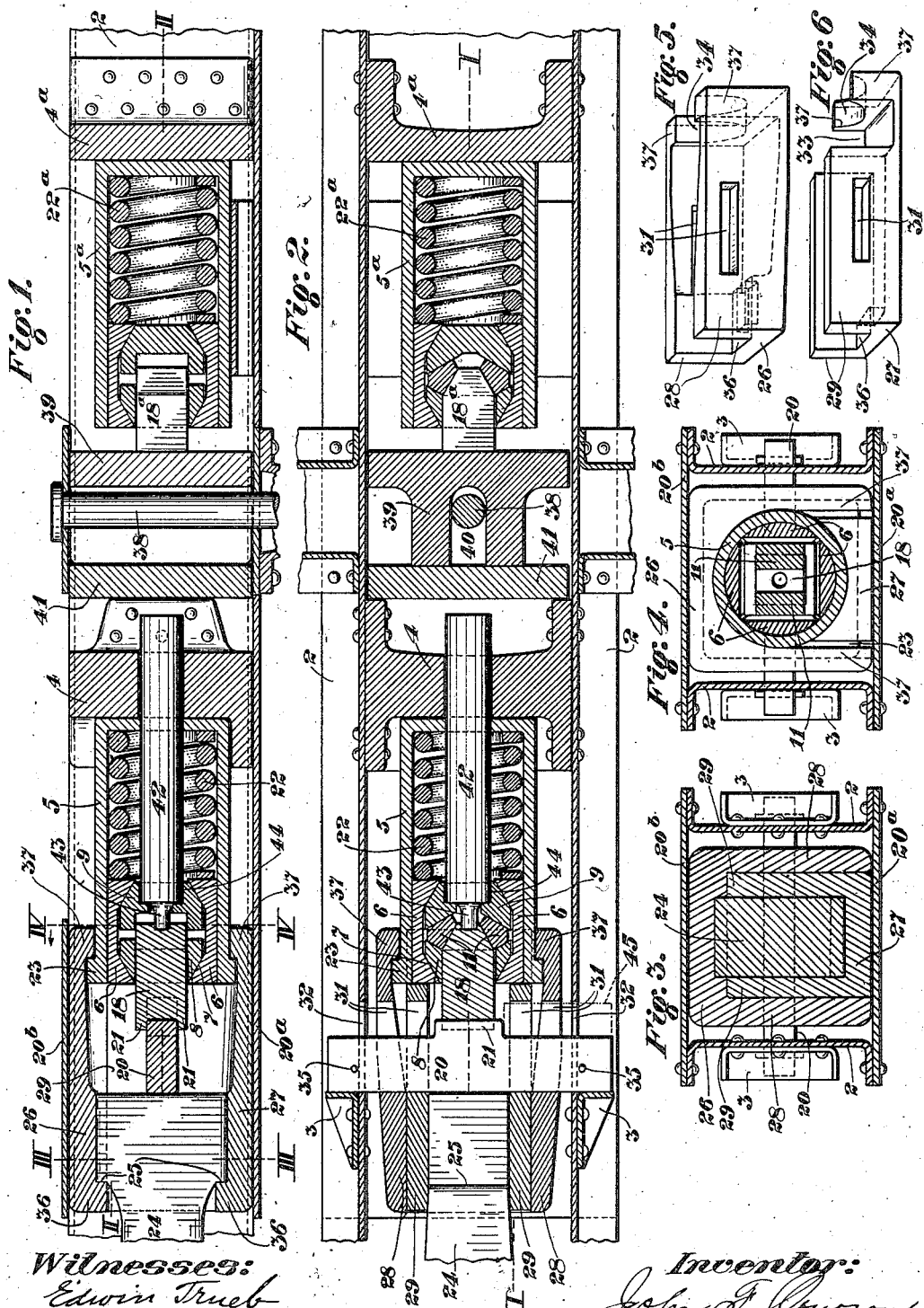

JOHN F. COURSON, OF PITCAIRN, PENNSYLVANIA.

DRAFT-GEAR.

1,161,032.  Specification of Letters Patent.  Patented Nov. 23, 1915.

Application filed January 9, 1912. Serial No. 670,285.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention relates to the class of draft gearing for railway cars and it has for its object to provide a draft gear of simple construction, adapted for easy insertion in or removal from the usual car framing, with means providing a strong serviceable connection between the drawbar and the gear, and features of improved construction facilitating the use of a plurality of gears in tandem arrangement, with other features of novelty and advantage, as shall be more fully hereinafter described.

Preferred arrangements of the invention are shown in the accompanying drawings, in which:—

Figure 1 is a longitudinal vertical sectional view showing two gears mounted in tandem operative arrangement, in normal position, indicated by the line I. I. of Fig. 2. Fig. 2 is a longitudinal horizontal sectional view of the construction shown in Fig. 1, indicated by the line II. II. of said Fig. 1. Figs. 3 and 4 are cross sections indicated by the lines III. III. and IV. IV. of Fig. 1. Figs. 5 and 6 are perspective detail views of the coupling boxes for slidably connecting the drawbar with the gear case.

The drawings show an arrangement of the invention in which two gears are applied to the framing of a steel car having the usual center sills 2, 2, a pair of laterally arranged brackets 3, 3, secured to the sills 2 by rivets or otherwise, and a rear abutment 4 for the front gear case similarly secured. Inasmuch as the front gear alone is equipped with my improved coupling mechanism, connecting it with the drawbar, the following description of said parts refers to it particularly.

The gear case 5, which may be of any suitable or preferred construction, is generally cylindrical in form, adapted to contain any suitable friction-creating mechanism, and normally abuts by its rear end against the abutment 4.

While the invention is not restricted to any particular friction mechanism, I have shown a plurality, preferably four, of segmental friction shoes 6 having outer faces conforming to the curvature of the inner surface of the cylinder 5, and having inner inclined wedging faces 7, 7, at each end, oppositely disposed, with an intervening clearance space. Within said friction shoes and in operative postion with relation to the faces 7, are the single expanding wedges 8 and 9 respectively at front and rear, each of which is provided with series of outer wedge faces conforming to and adapted to operatively engage the endmost series of faces 7 of shoes 6 to press them outwardly into binding frictional engagement with the cylinder, when the wedges 8 and 9 are separated longitudinally. This latter effect is secured by means of a plurality, preferably two, of intervening friction blocks 11, of generally wedge shape, having oppositely disposed outer wedge faces adapted to engage corresponding inner friction faces of the endmost friction wedges 8 and 9. Each friction block 11 is also provided on its inner side with a wedge face adapted to co-act with one of the wedge faces of a central wedge block 18. In this respect the gear is similar in construction and operation to the one forming the subject-matter of a companion application filed herewith, Serial No. 670,284.

The central wedge 18 extends through a central clearance opening in block 8 and forwardly beyond the group of assembled wedges, and bears by its front end against the rear of a transverse follower 20, preferably having a lipped engagement therewith, as indicated at 21. A spring 22 is mounted within the casing 6, bearing by its rear end against the inner end of the casing and at front against the inner ends of friction shoes 6.

The casing 5 is annularly flanged at its front end as indicated at 23 for the purpose of providing for connection with the drawbar 24. Said drawbar, which may be of any desired construction as to its coupler head, is enlarged at the rear end, providing substantial shoulders or abutments 25 at top and bottom, more clearly shown in Fig. 1.

For the purpose of connecting the drawbar with the casing, I use a two-part coupling box consisting of interfitting top and bottom box members 26 and 27. Each of said members is rectangular in form, having longitudinal sides 28 and 29 respectively, interfitting with each other and overlapping at each side of a middle clearance space, through which extends the shank of the drawbar 24. The rear end of each member 26 and 27 is rounded in semi-circular formation, as indicated at 34, for engagement with the annular shoulder 23 of the casing.

Each side-wall 28 of member 26 and each side wall 29 of member 27 is longitudinally slotted, as indicated at 31. When said members are assembled in engagement with the inner head of the drawbar, said slots are in registering position, and provide transverse clearance for the follower 20, which extends outwardly at each side through similar slots 32 in the webs of the center sills 2. The inner box member 27 is recessed, as at 33, for clearance of the annular flange abutment 23, and the inner ends of the side walls 29 thereby abut directly against the lower end of the casing 5, as clearly shown in Fig. 6.

The outer box member 26 embraces the upper semi-cylindrical portion of the casing 5 and the annularly recessed inner end portions 34 of each of said box members engage behind the upper and lower cylindrical flange abutment 23 and completely surround it. The rear portions 37 of the box members 26 and 27 extend inwardly behind the annular shoulder 23 so that when the box members are assembled, they will be held in embracing position by the transverse follower 20. Said follower is provided with retaining keys or pins 35 at each end, preventing longitudinal movement or displacement.

At the front ends the box members are provided with inwardly extending lips or flanges 36, adapted when assembled, to engage the shoulders 25 of the drawbar, in the same manner as the inwardly turned lips 37. In addition to the holding action of the follower 20, I also provide a bottom plate 20ᵃ and a top plate 20ᵇ, extending across and connected to the center sill members 2, and embracing the box members at top and bottom. By this means the supporting of the box-housing is insured in addition to the action of the follower. (See Figs. 3 and 4.) By this construction and arrangement the casing and drawbar are connected but are capable of relative longitudinal movement, due to the slots 31 being considerably longer than the width of the follower 20, and the follower also has the same degree of movement through said slots and slots 32, in the operation of buffing. On the other hand the assembled coupling boxes 26 and 27, with the casing 5, have the same extent of forward movement with relation to the relatively stationary follower 20, in the operation of pulling.

The drawings show a tandem arrangement of duplicate gears, whereby to provide for a partial absorption of the buffing shocks in the front gear, and supplemental absorption by an additional gear located between the side members forming the center sill and rearwardly behind the usual king pin 38, adapted to operate in combined resistance to buffing strains with the front gear.

A slidably mounted block 39 is mounted between the center sills 2, provided with a clearance slot 40 for the king pin 38 and extending forwardly and backwardly of the king pin. Between blocks 39 and abutment 4 is inserted a follower 41, while a similar abutment 4ᵃ is fixedly secured between the center sill members 2, as indicated, by riveting or otherwise, providing a solid packing for the supplemental gear case 5ᵃ. Said gear case is similar to the gear case 5 already described and is provided with similar friction-creating mechanism, the casing, however, being continuously straight and without the terminal annular abutment 23.

A central wedge post 18ᵃ extends forwardly of the gear case 5ᵃ and abuts against the rear end of sliding block 39, so that when the gear is assembled, as shown in Figs. 1 and 2, and compressed, there will be a direct transmission of impart force from follower 41 through block 39 and wedge post 18ᵃ to the assembled friction-creating and spring mechanism within the casing 5ᵃ, which in turn bears against the solid rear abutment 4ᵃ.

For the purpose of transmitting any unabsorbed shock remaining after the capacity of the front gear within the casing 5 has been partly developed, a thrust bar 42 is inserted through the rear end of front casing 5 and a suitable opening in abutment 4, which bar abuts by a reduced terminal 43, against the inner end of the front wedge post 18. The rear wedge block 9 of the friction mechanism of the front casing is also suitably recessed, as indicated at 44, for clearance of the front end of bar 42, as clearly shown, so that its functions are not in any way interfered with. As the drawbar 24 is forced backwardly against follower 20 and the strain is transmitted to the wedge block 18, it in turn pushes bar 42 backwardly during the impact-absorbing operation of the front gear, until the rear end of bar 42 makes abutting contact with follower 41. Thereafter any additional or backward travel of the drawbar will effect backward movement of follower 41 and block 39, transmitting movement through the second wedge block 18ᵃ to the second assembled friction mechanism within casing 5ᵃ.

The especial advantage of such construction and arrangement is that the resisting effect of the front gear is supplemented by that of the rear gear, and that after a certain amount of frictional resistance is developed in the front gear, both gears act together with a greatly increased aggregate resistance. This is of especial advantage in the case of unusual or extra heavy impacts in buffing, while the front gear is entirely capable of independent operation to take care of ordinary pulling strains.

When it is desired to temporarily lock each adjacent connecting gear of two cars which are coupled together, against any buffing action, I use spacing blocks 45, indicated in dotted lines, Fig. 2. Such blocks are inserted through slots 32 and 31 between the follower 20 and the rear ends of said slots, thereby preventing any movement of the gears so that there is no movement of the cars toward or from each other in travel. This is of especial advantage where two cars are used for carrying merchandise which extends from one car to the other, as extra long lumber, steel girders, etc.

The construction and operation of the gear will be readily understood from the foregoing description. The mounting of the front gear, which may, of course, be used alone if desired, between the center sills and with the drawbar by the slotted box housings and follower, provides for easy and convenient installation or removal. The gear and drawbar are maintained in operative position with ample freedom of longitudinal movement of the drawbar in either direction, and the several strains are imparted directly through the resisting mechanism to the car framing.

When the tandem arrangement is used, the heavier shocks are amply provided for so that undue or unusual strains will not tend to break or damage any of the parts.

What I claim is:

1. A draft gear comprising a shock absorbing member having a casing provided at its front end with laterally extending shoulders, a drawbar, and separable housings embracing the drawbar by their forward portions and having at their rear portions inwardly extending projections engaging said shoulders and connecting the housings with the front portion of said casing and providing for relative longitudinal movement of the drawbar toward the casing.

2. A draft gear comprising a shock absorbing member having a casing provided at its front end with laterally extending shoulders, a resisting backing for said casing, a drawbar, and separable housings embracing the drawbar by their forward portions and having at their rear portions inwardly extending projections engaging said shoulders and connecting the housings with the front portion of said casing and providing for independent inward movement of the drawbar and outward movement of the drawbar and said casing together.

3. A draft gear comprising a shock absorbing member, a resisting backing for said member, a drawbar, separable longitudinally slotted embracing housings connecting the drawbar with said member, and a transverse follower extending through said housings for holding them in engagement with the shock absorbing member and adapted to transmit strains from the drawbar to said member.

4. The combination with a car framing having longitudinal slots and front abutments, and a rear abutment, of a shock absorbing member, a drawbar, separable embracing housings connecting the drawbar with said member and having overlapping longitudinally slotted sides, and a transverse follower extending through the slotted sides of said housings and the slots of the car framing adapted to engage said front abutments, and to transmit drawbar strains through the shock absorbing member to the car framing.

5. The combination with a car framing having longitudinal slots, a lower supporting plate, front abutments, and a rear abutment, of a shock absorbing member, a drawbar, separable embracing housings connecting the drawbar with said member and having overlapping longitudinally slotted sides, and a transverse follower extending through the slotted sides of said housings and the slots of the car framing adapted to engage said front abutments, and to transmit drawbar strains through the shock absorbing member to the car framing.

6. The combination with a car framing having longitudinal slots and front abutments, and a rear abutment, of a shock absorbing member, a drawbar, a plurality of interengaging housing boxes connecting the drawbar and shock absorbing member and having longitudinal transverse slots, and a transverse follower extending through the slots in said boxes and car framing adapted to engage said front abutments, drawbar, and the shock absorbing member.

7. In a draft gear, the combination with a shock absorbing member having forwardly extending rigidly connected slotted coupling extensions, of a drawbar having shouldered engagement with said extensions, and a follower located between the drawbar and shock absorbing member and projecting through said slotted extensions.

8. In a draft gear the combination with a shock absorbing member provided with a projecting impact receiving element and forwardly extending rigidly connected slotted coupling extensions, of a drawbar having shouldered engagement with said extensions, and a follower located between the drawbar and the impact receiving element and projecting through said slotted extensions.

9. In a draft gear, the combination with a friction gear casing having an annular shoulder, of separable housing boxes embracing said shoulder and having forwardly extending drawbar-engaging portions.

10. In a draft gear, the combination with a friction gear casing having an annular shoulder, of separable housing boxes embracing said shoulder and having forwardly extending overlapping longitudinally slotted sides and provided with terminal drawbar engaging shoulders.

11. In a draft gear, the combination with a friction gear casing having an annular shoulder, of separable housing boxes embracing said shoulder and having forwardly extending overlapping longitudinally slotted sides and drawbar engaging shoulders, a drawbar engaged thereby, and a transverse follower extending through said slotted sides between the drawbar and the casing.

12. In a device of the character described, a shell to contain the compression resisting parts, a drawbar, followers, and a member connecting the drawbar and shell, said member being provided at its forward end with a box like opening to receive the drawbar, lugs at its rear end to engage the shell, and an intermediate transverse opening through which the front follower is disposed.

In testimony whereof I hereunto affix my signature in the presence of two witnesses.

JOHN F. COURSON.

Witnesses:
C. M. CLARKE,
EDWIN TRUEB.